US010422408B2

(12) United States Patent
Kojima et al.

(10) Patent No.: US 10,422,408 B2
(45) Date of Patent: Sep. 24, 2019

(54) DYNAMIC VIBRATION ABSORBING DEVICE AND FLUID COUPLING

(71) Applicant: EXEDY Corporation, Neyagawa-shi, Osaka (JP)

(72) Inventors: Yoshihiro Kojima, Neyagawa (JP); Kazushi Sone, Osaka (JP); Takumi Imada, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 118 days.

(21) Appl. No.: 15/558,125

(22) PCT Filed: Feb. 9, 2016

(86) PCT No.: PCT/JP2016/053790
§ 371 (c)(1),
(2) Date: Sep. 13, 2017

(87) PCT Pub. No.: WO2016/147750
PCT Pub. Date: Sep. 22, 2016

(65) Prior Publication Data

US 2018/0045270 A1 Feb. 15, 2018

(30) Foreign Application Priority Data

Mar. 19, 2015 (JP) ................................ 2015-055837

(51) Int. Cl.
*F16F 15/14* (2006.01)
*F16F 15/167* (2006.01)
*F16H 45/02* (2006.01)

(52) U.S. Cl.
CPC ........ *F16F 15/1421* (2013.01); *F16F 15/167* (2013.01); *F16H 45/02* (2013.01);
(Continued)

(58) Field of Classification Search
CPC . F16D 2300/22; F16F 15/1421; F16F 15/167; F16F 2224/0208; F16H 45/02;
(Continued)

(56) References Cited

U.S. PATENT DOCUMENTS 4,944,712 A 7/1990 Woerner et al.
5,984,065 A * 11/1999 Teramae ................ F16H 45/02 192/205
(Continued)

FOREIGN PATENT DOCUMENTS

CN 103221713 A 7/2013
CN 103899707 A 7/2014
(Continued)

OTHER PUBLICATIONS

International Search Report dated Apr. 12, 2016 for corresponding foreign Application No. PCT/JP2016/053790, 2 pp.
(Continued)

*Primary Examiner* — Mark A Manley
(74) *Attorney, Agent, or Firm* — United IP Counselors, LLC

(57) ABSTRACT

A dynamic vibration absorbing device inhibits fluctuations in rotational velocity of a rotary member. The dynamic vibration absorbing device includes a tubular member having an annular shape, the tubular member including a slit extending in a circumferential direction. The dynamic vibration absorbing device also includes at least one elastic member disposed inside the tubular member, the at least one elastic member disposed to be non-rotatable relatively to the tubular member. In addition, the dynamic vibration absorbing device includes a support member including an attachment part, a support part and a coupling part, the attachment part attachable to the rotary member, the support part disposed inside the tubular member, the support part dis-
(Continued)

posed to be rotatable relatively to the tubular member, the coupling part coupling the attachment part and the support part through the slit.

8 Claims, 4 Drawing Sheets

(52) U.S. Cl.
CPC ................ *F16F 2224/0208* (2013.01); *F16H 2045/0226* (2013.01); *F16H 2045/0263* (2013.01); *F16H 2045/0278* (2013.01)

(58) Field of Classification Search
CPC ..... F16H 2045/0278; F16H 2045/0263; F16H 2045/0226
See application file for complete search history.

(56) References Cited

U.S. PATENT DOCUMENTS

| | | | |
|---|---|---|---|
| 2009/0091070 | A1 | 4/2009 | Mueller et al. |
| 2011/0240432 | A1 | 10/2011 | Takikawa et al. |
| 2014/0182412 | A1 | 7/2014 | Lee et al. |
| 2015/0345565 | A1 | 12/2015 | Tomiyama |

FOREIGN PATENT DOCUMENTS

| | | | |
|---|---|---|---|
| CN | 103911811 | A | 7/2014 |
| CN | 105308355 | A | 2/2016 |
| DE | 102008045254 | A1 | 3/2009 |
| EP | 0321697 | A2 | 6/1989 |
| EP | 2749788 | A2 | 7/2014 |
| JP | H101206136 | A | 8/1989 |
| JP | 2009068707 | A | 4/2009 |
| JP | 2011-214608 | A | 10/2011 |
| JP | 2011214607 | A | 10/2011 |
| JP | 2014114912 | A | 6/2014 |
| JP | 5555784 | B1 | 7/2014 |
| WO | 2010/013541 | A1 | 2/2010 |
| WO | 2011122130 | A1 | 10/2011 |
| WO | 2014132906 | A1 | 9/2014 |

OTHER PUBLICATIONS

First Office Action of the corresponding Chinese patent application No. 201680015240.6, dated Sep. 17, 2018, 5 pp.

* cited by examiner

DYNAMIC VIBRATION ABSORBING DEVICE AND FLUID COUPLING

CROSS-REFERENCES TO RELATED APPLICATIONS

This application is the U.S. National Phase of PCT International Application No. PCT/JP2016/053790, filed on Feb. 9, 2016. That application claims priority to Japanese Patent Application No. 2015-055837, filed Mar. 19, 2015. The contents of both of those applications are herein incorporated by reference in their entirety.

BACKGROUND

Technical Field

The present disclosure relates to a dynamic vibration absorbing device and a fluid coupling.

BACKGROUND ART

A torque converter transmits a torque from an engine to a transmission. The torque converter includes a dynamic vibration absorbing device in order to inhibit fluctuations in rotational velocity of a rotary member composing the torque converter. For example, a dynamic vibration absorbing device, included in a torque converter described in Publication of Japan Patent No. 5555784, inhibits fluctuations in rotational velocity of a rotary member by an inertia ring rotated relatively to the rotary member.

SUMMARY

The inertia ring in the aforementioned dynamic vibration absorbing device is formed by hollowing out the middle part of a disc-shaped member. The hollowed-out middle part is unnecessary, and hence, a yield rate inevitably degrades in forming the dynamic vibration absorbing device.

It is an object of the present disclosure to provide a dynamic vibration absorbing device that the yield rate thereof can be enhanced.

Solution to Problems

A dynamic vibration absorbing device according to a first aspect of the present disclosure is a dynamic vibration absorbing device for inhibiting fluctuations in rotational velocity of a rotary member. The dynamic vibration absorbing device includes a tubular member, at least one elastic member and a support member. The tubular member has an annular shape. The tubular member includes a slit extending in a circumferential direction. The at least one elastic member is disposed inside the tubular member. The at least one elastic member is disposed to be non-rotatable relatively to the tubular member. The support member includes an attachment part, a support part and a coupling part. The attachment part is attachable to the rotary member. The support part is disposed inside the tubular member. The support part is disposed to be rotatable relatively to the tubular member. The coupling part couples the attachment part and the support part through the slit.

When the dynamic vibration absorbing device according to the present disclosure is attached to a rotary member, fluctuations in rotational velocity of the rotary member can be inhibited. In other words, the tubular member is rotatable relatively to the support member through the at least one elastic member. Hence, fluctuations in rotational velocity of the support member can be attenuated by the tubular member and the at least one elastic member. Therefore, when the support member is directly or indirectly attached to the rotary member, fluctuations in rotational velocity of the rotary member can be attenuated. Additionally, unlike a well-known inertia ring, the tubular member does not have a configuration obtained by hollowing out the middle part of a disc-shaped member. Hence, the yield rate can be herein enhanced.

Preferably, the attachment part is disposed radially inside the tubular member. Additionally, the slit is included in a radially inner lateral surface of the tubular member. According to this configuration, the tubular member is designed to be disposed outside. Hence, fluctuations in rotational velocity of the rotary member can be further attenuated.

Preferably, the at least one elastic member includes two elastic members. In other words, the dynamic vibration absorbing device includes two elastic members. Additionally, the support part is disposed between the two elastic members. According to this configuration, fluctuations in rotational velocity of the rotary member can be attenuated as appropriately as possible.

Preferably, the dynamic vibration absorbing device further includes a coupling member. Additionally, the tubular member includes a plurality of tubular parts coupled to each other by the coupling member. According to this configuration, the tubular member can be easily formed.

Preferably, the at least one elastic member is disposed between the coupling member and the support part.

Preferably, the dynamic vibration absorbing device further includes a plurality of elastic units. Each elastic unit includes two of the at least one elastic member and the coupling member.

Additionally, the plurality of elastic units are disposed at intervals in the circumferential direction, and the support part is disposed between adjacent two of the plurality of elastic units.

Preferably, the coupling member includes a large diameter part, a first small diameter part and a second small diameter part. The large diameter part is disposed between adjacent two of the plurality of tubular parts. The first small diameter part protrudes from one surface of the large diameter part into one of the adjacent two of the plurality of tubular parts. The second small diameter part protrudes from the other surface of the large diameter part into the other of the adjacent two of the plurality of tubular parts. According to this configuration, one of the adjacent two tubular parts can be supported by the first small diameter part, whereas the other of the adjacent two tubular parts can be supported by the second small diameter part. Additionally, the first small diameter part is designed to be fitted to one of the adjacent two tubular parts whereas the second small diameter part is designed to be fitted to the other of the adjacent two tubular parts, whereby the respective tubular parts can be coupled to each other as easily as possible.

A fluid coupling according to a second aspect of the present disclosure includes a front cover, an impeller, a turbine, a lock-up device, an output hub and the dynamic vibration absorbing device. The front cover is a constituent element to which a torque is inputted. The impeller is fixed to the front cover. The turbine is opposed to the impeller. The lock-up device is disposed between the front cover and the turbine. The output hub outputs the torque. The dynamic vibration absorbing device has any of the aforementioned configurations of the dynamic vibration absorbing device, and is attached to any of the turbine, the lock-up device and the output hub.

The dynamic vibration absorbing device according to the present disclosure can enhance the yield rate thereof.

DETAILED DESCRIPTION OF EMBODIMENTS

An exemplary embodiment of a dynamic vibration absorbing device according to the present disclosure and a torque converter (an exemplary fluid coupling) using the same will be hereinafter explained with reference to drawings. It should be noted that the term "axial direction" means an extending direction of a rotational axis of the dynamic vibration absorbing device, whereas the term "circumferential direction" means a circumferential direction of an imaginary circle about the rotational axis of the dynamic vibration absorbing device. On the other hand, the term "radial direction" means a radial direction of the imaginary circle about the rotational axis of the dynamic vibration absorbing device. It should be noted that in the present exemplary embodiment, the rotational axis of the dynamic vibration absorbing device and a rotational axis O of the torque converter are substantially the same.

Figure 1:
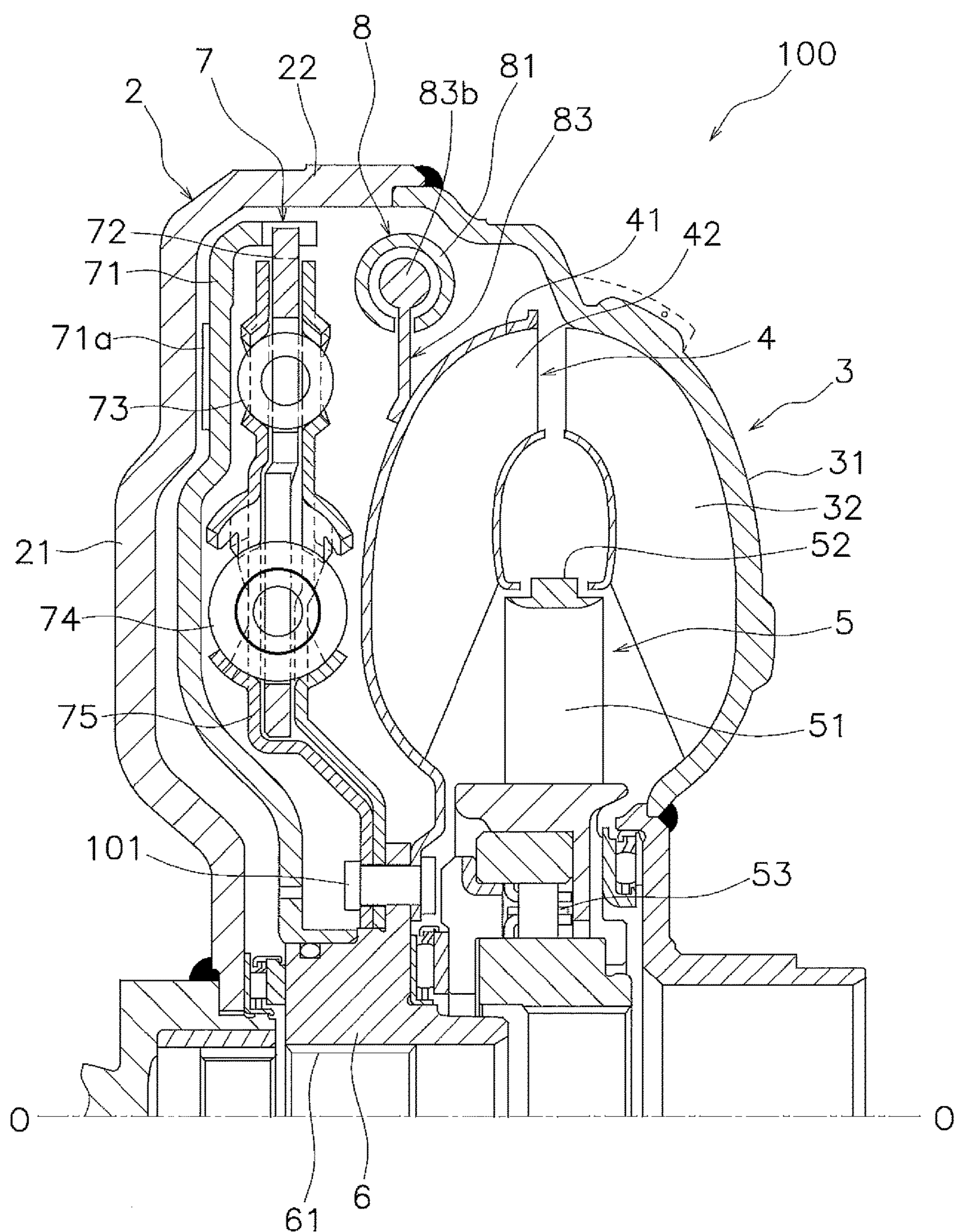
FIG. 1 is a cross-sectional view of a torque converter.

As shown in FIG. 1, a torque converter 100 includes a front cover 2, an impeller 3, a turbine 4, a stator 5, an output hub 6, a lock-up device 7 and a dynamic vibration absorbing device 8. It should be noted that although an engine and a transmission are not shown in FIG. 1, the engine is disposed on the left side of the torque converter 100 whereas the transmission is disposed on the right side of the torque converter 100.

The front cover 2 is a member that a torque from the engine is inputted thereto. Detailedly, the front cover 2 includes a disc part 21 and a circumferential wall part 22. The circumferential wall part 22 extends from the outer peripheral end of the disc part 21 toward the transmission.

The impeller 3 is fixed to the front cover 2. The impeller 3 includes an impeller shell 31 and a plurality of impeller blades 32. The impeller shell 31 is fixed to the front cover 2. Detailedly, the impeller shell 31 is welded to the front cover 2. The impeller blades 32 are attached to the impeller shell 31.

The turbine 4 is disposed in axial opposition to the impeller 3. The turbine 4 includes a turbine shell 41 and a plurality of turbine blades 42. The turbine blades 42 are attached to the turbine shell 41.

The stator 5 is a mechanism disposed between the impeller 3 and the turbine 4 so as to regulate the flow of hydraulic oil returning from the turbine 4 to the impeller 3. The stator 5 includes a stator carrier 51 and a stator blade 52. The stator carrier 51 is supported by a stationary shaft (not shown in the drawings) through a one-way clutch 53. The stator blade 52 is attached to the outer peripheral surface of the stator carrier 51.

The output hub 6 outputs a torque toward the transmission through an output shaft (not shown in the drawings). The output hub 6 is unitarily rotated with the turbine 4. Detailedly, the turbine 4 is fixed to the output hub 6 by a plurality of rivets 101. The output hub 6 includes a hole 61. The output shaft (not shown in the drawings) is fitted to the hole 61 of the output hub 6. Detailedly, the output shaft is spline-coupled to the hole 61 of the output hub 6.

The lock-up device 7 is disposed between the front cover 2 and the turbine 4. The lock-up device 7 is configured to allow or block transmission of the torque from the front cover 2 to the output hub 6. The lock-up device 7 includes a piston plate 71, an input plate 72, at least one outer peripheral side torsion spring 73, at least one inner peripheral side torsion spring 74 and an output plate 75.

The piston plate 71 is slidable on the output hub 6 in the axial direction. The piston plate 71 is engaged by friction with the front cover 2 through a friction member 71*a* provided on the outer peripheral part of the piston plate 71.

The torque, transmitted from the front cover 2 to the piston plate 71, is transmitted to the input plate 72, and is then transmitted to the output plate 75 through the at least one outer peripheral side torsion spring 73 and the at least one inner peripheral side torsion spring 74. The output plate 75 is unitarily rotated with the output hub 6.

The dynamic vibration absorbing device 8 is a device for attenuating fluctuations in rotational velocity. The dynamic vibration absorbing device 8 is attached to, for instance, the turbine 4. Specifically, the dynamic vibration absorbing device 8 is attached to the turbine shell 41. It should be noted that the dynamic vibration absorbing device 8 may be attached, not to the turbine 4, but to another member. For example, the dynamic vibration absorbing device 8 may be attached to any of the constituent members of the lock-up device 7, or alternatively may be attached to the output hub 6.

Figure 2:
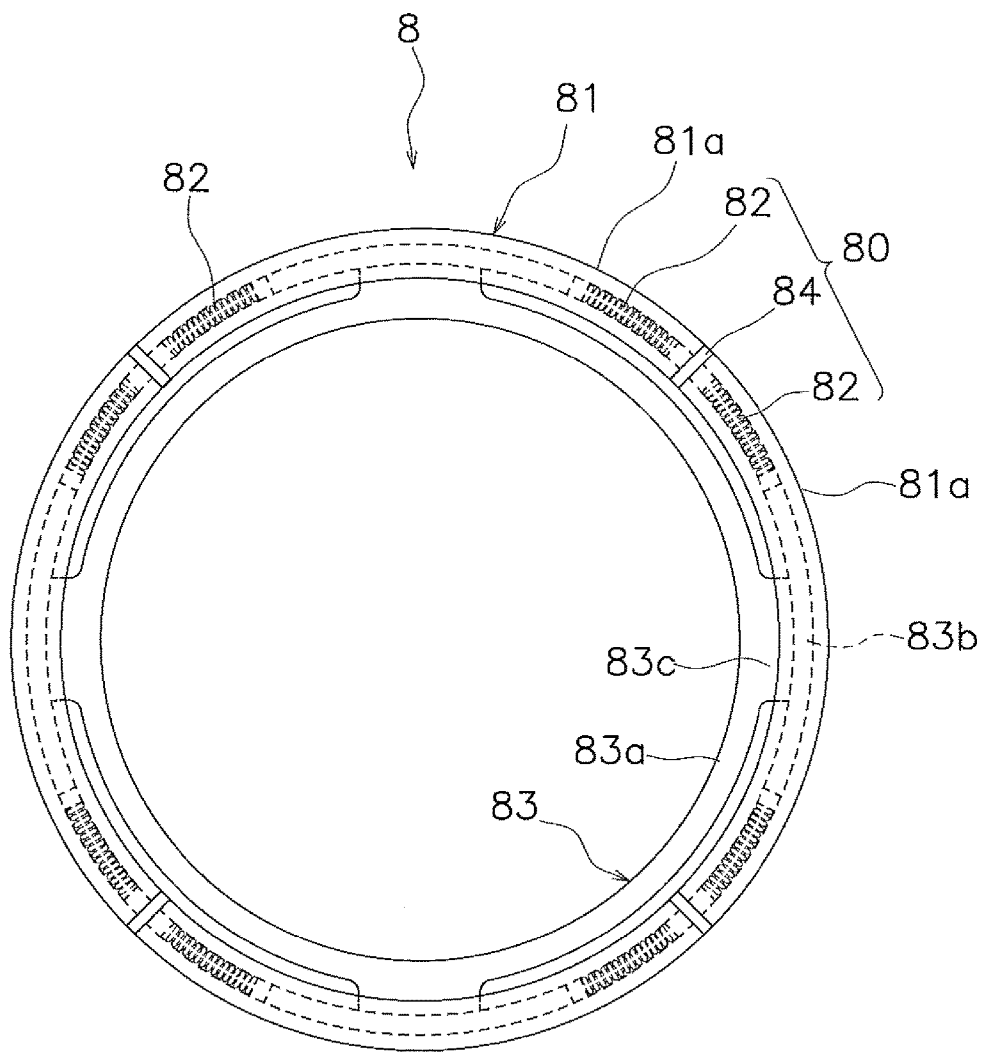
FIG. 2 is a front view of a dynamic vibration absorbing device.
Figure 3:
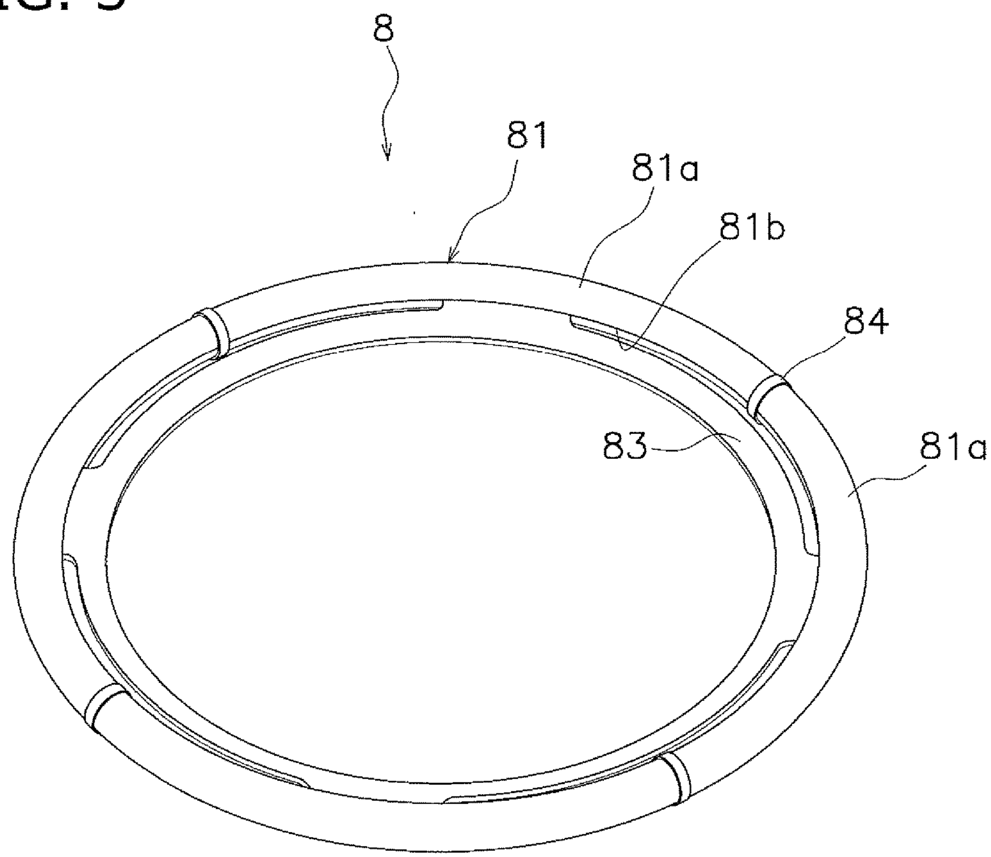
FIG. 3 is a perspective view of the dynamic vibration absorbing device and shows the interior of a tubular member.

FIG. 2 is a front view of the dynamic vibration absorbing device 8 as seen from the engine side, whereas FIG. 3 is a perspective view of the dynamic vibration absorbing device 8. As shown in FIG. 2, the dynamic vibration absorbing device 8 includes a tubular member 81, a plurality of elastic members 82 and a support member 83. Additionally, the dynamic vibration absorbing device 8 further includes a plurality of coupling members 84.

As shown in FIGS. 2 and 3, the tubular member 81 has an annular shape. The tubular member 81 is rotatable relatively to the support member 83. The tubular member 81 includes a slit 81*b* extending in the circumferential direction. Detailedly, the slit 81*b* is included in the radially inner lateral surface of the tubular member 81. In other words, the slit 81*b* is opened toward the rotational axis O. The inside and outside of the tubular member 81 are communicated through the slit 81*b*. The slit 81*b* may be entirely or intermittently provided in the tubular member 81 in the circumferential direction.

The tubular member 81 includes a plurality of tubular parts 81*a*. For example, the tubular member 81 in the present exemplary embodiment includes four tubular parts 81*a*. Each tubular part 81*a* is made in the shape of a circular arc about the rotational axis O. The annular tubular member 81 is formed by coupling the respective circular-arc tubular parts 81*a* to each other. Adjacent two of the tubular parts 81*a* are coupled through one of the coupling members 84. The tubular member 81 is preferably rode of steel material, and is more preferably made of stainless steel material or carbon steel material for machine structural use. More specifically, the tubular member 81 is made of SUS304, STKM13A or so forth.

Figure 4:
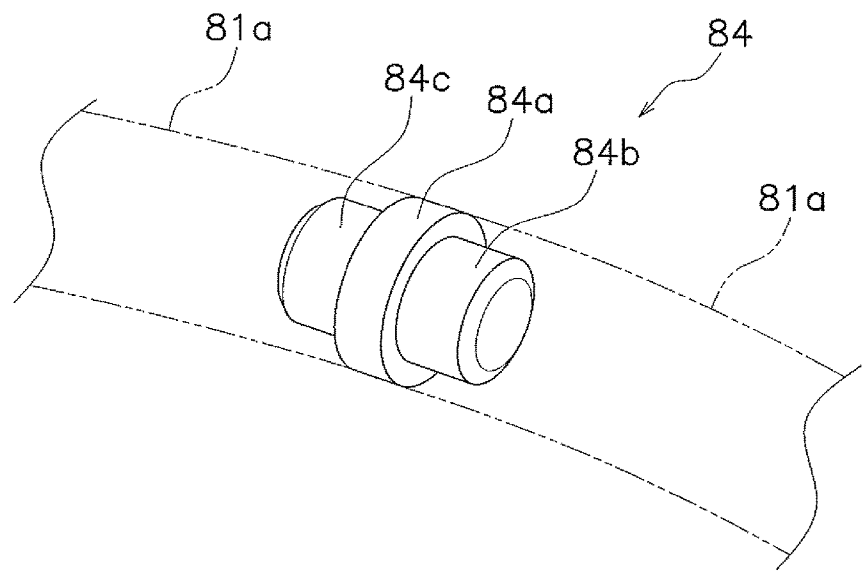
FIG. 4 is a perspective view of a coupling member.

Each coupling member 84 is a member for coupling adjacent two of the tubular parts 81*a*. As shown in FIG. 4, each coupling member 84 includes a large diameter part 84*a*, a first small diameter part 84*b* and a second small diameter part 84*c*. The large diameter part 84*a* is disposed between adjacent two of the tubular parts 81*a*. The large diameter part 84*a* is interposed between adjacent two of the tubular parts 81*a*. Detailedly, the outer diameter of the large diameter part 84*a* is greater than the inner diameter of each tubular part 81*a*. Therefore, the large diameter part 84*a* cannot be disposed in the interior of each tubular part 81*a*. It should be noted that preferably, the outer diameter of the large diameter part 84*a* is roughly equal to that of each tubular part 81*a*.

The first small diameter part 84*b* protrudes from one surface of the large diameter part 84*a* into one of the adjacent two tubular parts 81*a*. In other words, the first small diameter part 84*b* is disposed inside the one of the adjacent two tubular parts 81*a*. It should be noted that the first small diameter part 84*b* is fitted to the one of the adjacent two tubular parts 81*a*. Specifically, the first small diameter part 84*b* can be fitted to the tubular part 81*a* by setting the outer diameter of the first small diameter part 84*b* to be approximately equal to the inner diameter of the tubular part 81*a*.

The second small diameter part 84*c* protrudes from the other surface of the large diameter part 84*a* into the other of the adjacent two tubular parts 81*a*. In other words, the second small diameter part 84*c* protrudes oppositely to the first small diameter part 84*b*. The second small diameter part 84*c* is disposed inside the other of the adjacent two tubular parts 81*a*. It should be noted that the second small diameter part 84*c* is fitted to the other of the adjacent two tubular parts 81*a*. Specifically, the second small diameter part 84*c* can be fitted to the tubular part 81*a* by setting the outer diameter of the second small diameter part 84*c* to be approximately equal to the inner diameter of the tubular part 81*a*. Thus, the first small diameter part 84*b* is fitted to one of the adjacent two tubular parts 81*a* whereas the second small diameter part 84*c* is fitted to the other of the adjacent two tubular parts 81*a*, whereby two tubular parts 81*a* are coupled through one coupling member 84.

As shown in FIG. 2, the respective elastic members 82 are disposed inside the tubular member 81. It should be noted that in the present exemplary embodiment, eight elastic members 82 are disposed inside the tubular member 81. Each elastic member 82 is disposed between one coupling member 84 and one support part 83*b*.

The respective elastic members 82 are non-rotatable relatively to the tubular member 81. In other words, the respective elastic members 82 are unitarily rotated with the tubular member 81. It should be noted that the respective elastic members 82 are contracted and expanded inside the tubular member 81. The respective elastic members 82 are, for instance, coil springs. The respective elastic members 82 extend inside the tubular member 81 in the circumferential direction. For example, the respective elastic members 82 are disposed inside the tubular member 81 while being compressed.

The respective elastic members 82 are installed at intervals in the circumferential direction. Detailedly, one coupling member 84 is disposed between two elastic members 82. Additionally, one of the elastic members $2 is supported on one side of the coupling member 84 in the circumferential direction, whereas the other of the elastic members 82 is supported on the other side of the coupling member 84 in the circumferential direction. Detailedly, one of the elastic members 82 makes contact with the first small diameter part 84*b*, whereas the other of the elastic members 82 makes contact with the second small diameter part 84*c*. With the coupling members 84, the respective elastic members 82 are configured to be non-rotatable relatively to the tubular member 81. A plurality of elastic units 80, each of which includes two elastic members 82 and one coupling member 84, are disposed at intervals in the circumferential direction. It should be noted that in the present exemplary embodiment, four elastic units 80 are disposed at intervals.

As shown in FIG. 1, the support member 83 is attached to a constituent member of the torque converter 100. Specifically, the support member 83 is attached to the turbine 4 (an exemplary rotary member). More specifically, the support member 83 is attached to the turbine shell 41 (an exemplary rotary member). The support member 83 supports the tubular member 81. The support member 83 has an approximately annular shape and is attached at the inner peripheral end thereof to the turbine shell 41.

Figure 5:
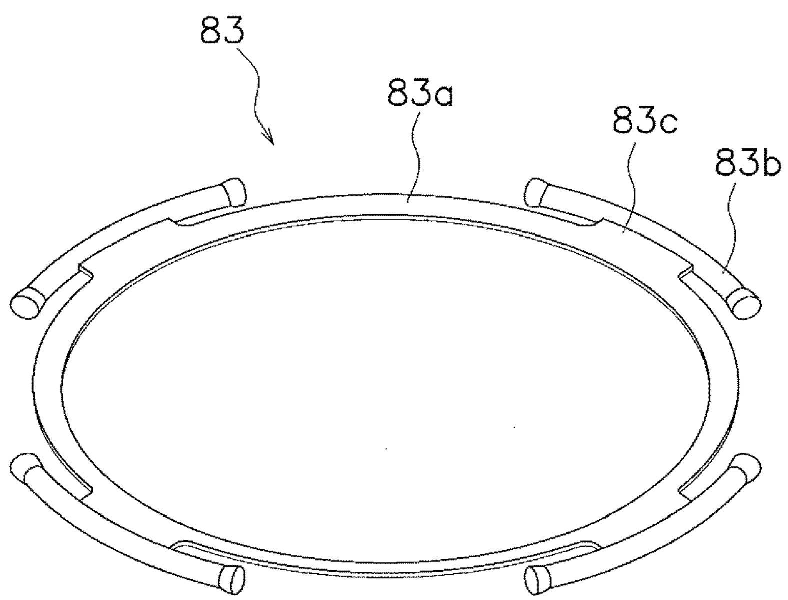
FIG. 5 is a perspective view of a support member.

As shown in FIG. 5, the support member 83 includes an attachment part 83*a*, a plurality of support parts 83*b* and a plurality of coupling parts 83*c*. The attachment part 83*a* is attachable to the turbine shell 41. The attachment part 83*a* has an annular shape and is attached at the inner peripheral end thereof to the turbine shell 41. For example, the attachment part 83*a* is attached to the turbine shell 41 by welding or so forth. The attachment part 83*a* is disposed radially inside the tubular member 81.

The respective support parts 83*b* are disposed inside the tubular member 81. The respective support parts 83*b* are rotatable relatively to the tubular member 81. The respective support parts 83*b* are disposed at intervals in the circumferential direction. Preferably, the respective support parts 83*b* are disposed at equal intervals. The respective support parts 83*b* are disposed radially outside the attachment part 83*a*.

As shown in FIG. 2, each support part 83*b* is disposed between two elastic members 82. Detailedly, each support part 83*b* is disposed between adjacent two of the elastic units 80. More detailedly, each support part 83*b* is disposed between the elastic member 82 making contact with the first small diameter part 84*b* in one of the adjacent two elastic units 80 and the elastic member 82 making contact with the second small diameter part 84*c* in the other of the adjacent two elastic units 80. Both ends of each support part 83*b* make contact with the elastic members 82. In other words, one end of each support part 83*b* makes contact with the elastic member 82 in one of the adjacent two elastic units 80, whereas the other end of each support part 83*b* makes contact with the elastic member in the other of the adjacent two elastic units 80.

The respective support parts 83*b* are restricted from circumferentially moving relatively to the tubular member 81 by the respective elastic members 82. Detailedly, the respective support parts 83*b* are restricted from rotating relatively to the tubular member 81 by the respective elastic members 82. Put differently, rotation of each support part 83*b* relative to the tubular member 81 is restricted so as to be allowed only by the amount of contraction and expansion of each elastic member 82. In other words, rotation of the tubular member 81 relative to each support part 83*b* is restricted so as to be allowed only by the amount of contraction and expansion of each elastic member 82.

Each support part 83*b* has a circumferentially extending shape, and is configured to slide inside the tubular member 81. Detailedly, both ends of each support part 83*b* slide inside the tubular member 81. Each support part 83*b* is made in the shape of a circular arc about the rotational axis O.

The coupling parts 83*c* couple the attachment part 83*a* and the support parts 83*b* through the slit 81*b*. In other words, the coupling parts 83*c* protrude radially outside from the attachment part 83*a* and are coupled to the support parts 83*b*. The coupling parts 83*c* are integrated with the attachment part 83*a* and the support parts 83*b*.

According to the dynamic vibration absorbing device 8 explained above, fluctuations in rotational velocity of the turbine 4 can be attenuated. In other words, the tubular member 81 is rotatable relatively to the support member 83 through the elastic members 82, whereby fluctuations in rotational velocity of the support member 83, and further, fluctuations in rotational velocity of the turbine 4 can be attenuated by the tubular member 81 and the elastic members 82. Additionally, unlike a well-known inertia ring, the tubular member 81 does not have a configuration obtained by hollowing out the middle part of a disc-shaped member. Hence, the yield rate can be herein enhanced.

MODIFICATIONS

The exemplary embodiment of the present disclosure has been described above. However, the present disclosure is not limited to this, and a variety of changes can be made without departing from the scope of the present disclosure.

Modification 1

Figure 6:
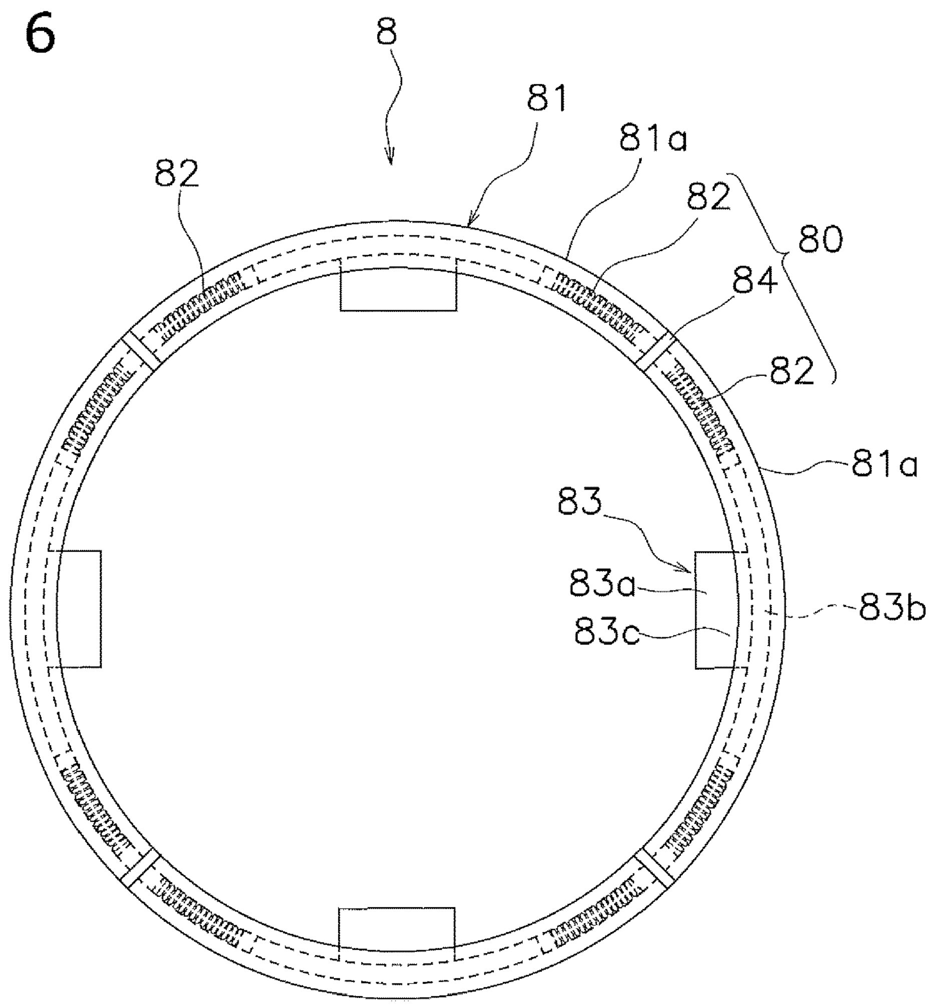
FIG. 6 is a front view of a dynamic vibration absorbing device according to Modification 1.

In the aforementioned exemplary embodiment, the attachment part 83*a* has an annular shape, but the shape of the attachment part 83*a* is not particularly limited to this. For example, as shown in FIG. 6, the attachment part 83*a* may be divided into plural ones. Detailedly, the number of the attachment parts 83*a* herein provided may be the same as that of the support parts 83*b*. In this case, the attachment parts 83*a* and the coupling parts 83*c* may be integrated.

Modification 2

In the aforementioned exemplary embodiment, the tubular member 81 is disposed radially outside the support member 83. However, the positional relation between the tubular member 81 and the support member 83 is not limited to this. For example, the tubular member 81 may be disposed radially inside the support member 83, or alternatively, may be disposed in axial opposition to the support member 83.

REFERENCE SIGNS LIST

2 Front cover
3 Impeller
4 Turbine
6 Output hub
7 Lock-up device
8 Dynamic vibration absorbing device
81 Tubular member
81*a* Tubular part
82 Elastic member
83 Support member
83*a* Attachment part
83*b* Support part
83*c* Coupling part
84 Coupling member
84*a* Large diameter part
84*b* First small diameter part
84*c* Second small diameter part
100 Torque converter

The invention claimed is:

1. A dynamic vibration absorbing device for inhibiting fluctuations in rotational velocity of a rotary member, the dynamic vibration absorbing device comprising: a tubular member having an annular shape, the tubular member including a slit extending in a circumferential direction and the tubular member having a plurality of separately formed circular-arc tubes joined end-to-end in the circumferential direction to form the annular shape; at least one elastic member disposed inside the tubular member, the at least one elastic member disposed to be non-rotatable relative to the tubular member; and a support member including an attachment part, a support part and a coupling part, the attachment part attachable to the rotary member, the support part disposed inside the tubular member, the support part disposed to be rotatable relative to the tubular member, the coupling part coupling the attachment part and the support part through the slit.

2. The dynamic vibration absorbing device according to claim 1, wherein the attachment part is disposed radially inside the tubular member, and the slit is included in a radially inner lateral surface of the tubular member.

3. The dynamic vibration absorbing device according to claim 1, wherein the at least one elastic member includes two elastic members, and the support part is disposed between the two elastic members.

4. The dynamic vibration absorbing device according to claim 1, further comprising:

one or more coupling members, the plurality of circular-arc tubes joined to each other by the one or more coupling members.

5. The dynamic vibration absorbing device according to claim 4, wherein the at least one elastic member is disposed between each of the one or more coupling members and the support part.

6. The dynamic vibration absorbing device according to claim 4, further comprising:

a plurality of elastic units each including two of the at least one elastic member and the coupling member, wherein the plurality of elastic units are disposed at intervals in the circumferential direction, and the support part is disposed between an adjacent two of the plurality of elastic units.

7. The dynamic vibration absorbing device according to claim 4, wherein each of the one or more coupling members includes a large diameter part, a first small diameter part and a second small diameter part, the large diameter part disposed between an adjacent two of the plurality of tubular parts, the first small diameter part protruding from one surface of the large diameter part into one of the adjacent two of the plurality of tubular parts, the second small diameter part protruding from the other surface of the large diameter part into the other of the adjacent two of the plurality of tubular parts.

8. A fluid coupling comprising:

a front cover to which a torque is inputted;

an impeller fixed to the front cover;

a turbine opposed to the impeller;

a lock-up device disposed between the front cover and the turbine;

an output hub for outputting the torque; and the dynamic vibration absorbing device recited in claim 1, the dynamic vibration absorbing device attached to any of the turbine, the lock-up device and the output hub.

* * * * *